(12) United States Patent
Hasei et al.

(10) Patent No.: US 7,145,725 B2
(45) Date of Patent: Dec. 5, 2006

(54) MICRO LENS AND FABRICATION METHOD OF MICRO LENS, OPTICAL DEVICE, OPTICAL TRANSMITTER, LASER PRINTER HEAD, AND LASER PRINTER

(75) Inventors: Hironori Hasei, Okaya (JP); Satoshi Kito, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/902,108

(22) Filed: Jul. 30, 2004

(65) Prior Publication Data
US 2005/0057813 A1  Mar. 17, 2005

(30) Foreign Application Priority Data
Aug. 13, 2003  (JP) ............... 2003-292989

(51) Int. Cl.
G02B 27/10 (2006.01)
B29D 11/00 (2006.01)
B41J 2/015 (2006.01)
B41J 23/00 (2006.01)
B32B 17/06 (2006.01)

(52) U.S. Cl. .............. 359/619; 359/811; 359/819; 264/1.38; 264/1.7; 347/20; 347/37; 347/40; 428/428; 427/162

(58) Field of Classification Search ............. 359/811, 359/819, 619, 808, 711, 712; 264/2.3, 2.4, 264/2.5, 2.6, 1.7, 1.38; 347/2, 20, 37, 40, 347/53, 106, 1, 71; 428/428, 430; 427/162, 427/163.2, 256, 279
See application file for complete search history.

(56) References Cited

U.S. PATENT DOCUMENTS

| | | | |
|---|---|---|---|
| 4,751,530 A * | 6/1988 | Elrod et al. .............. 347/46 |
| 5,229,016 A | 7/1993 | Hayes et al. |
| 5,498,444 A * | 3/1996 | Hayes ................... 427/163 |
| 5,707,684 A * | 1/1998 | Hayes et al. ............. 427/162 |
| 5,757,557 A * | 5/1998 | Medvedev et al. ......... 359/708 |
| 5,800,907 A * | 9/1998 | Yumoto .................. 428/195.1 |
| 6,155,699 A * | 12/2000 | Miller et al. ............. 362/293 |
| 6,304,384 B1 * | 10/2001 | Nishikawa ................ 359/619 |
| 6,618,200 B1 * | 9/2003 | Shimizu et al. ........... 359/619 |
| 6,814,901 B1 * | 11/2004 | Itoh ...................... 264/1.38 |
| 6,850,368 B1 * | 2/2005 | Shimizu et al. ........... 359/619 |
| 6,952,311 B1 * | 10/2005 | Sakai ..................... 359/619 |
| 7,006,296 B1 * | 2/2006 | Shimizu et al. ........... 359/619 |
| 7,040,741 B1 | 5/2006 | Nakamura et al. |
| 2003/0142167 A1 * | 7/2003 | Nakamura et al. .......... 347/37 |

(Continued)

FOREIGN PATENT DOCUMENTS

JP   A-2000-002802   1/2000

(Continued)

Primary Examiner—Loha Ben
(74) Attorney, Agent, or Firm—Oliff & Berridge, PLC

(57) ABSTRACT

A micro lens is provided with proper optical characteristics, such as a condensing function. Furthermore, a fabrication method of a micro lens is provided as well as, an optical device, an optical transmitter, a laser printer head, and a laser printer. The micro lens is equipped with a lens member formed by a liquid droplet ejection method, including: a base member formed on a substrate, a lens member formed on an upper surface of the above-mentioned base member to which the lens material is ejected in a plurality of dots by the liquid droplet ejection method, the upper surface of the base member having a concavity and a convexity with at least a part of the upper surface of the base member being subjected to repellant treatment.

12 Claims, 11 Drawing Sheets

U.S. PATENT DOCUMENTS

| | | |
|---|---|---|
| 2003/0151637 A1* | 8/2003 | Nakamura et al. ............. 347/20 |
| 2005/0007669 A1* | 1/2005 | Sakai .......................... 359/619 |
| 2005/0035474 A1* | 2/2005 | Itoh ........................... 264/1.38 |
| 2005/0058773 A1* | 3/2005 | Hasei et al. ................. 427/162 |
| 2005/0058840 A1* | 3/2005 | Toyoda ....................... 428/428 |

FOREIGN PATENT DOCUMENTS

| | | |
|---|---|---|
| JP | 2000-035504 | 2/2000 |
| JP | A-2000-199805 | 7/2000 |
| JP | 2000-280367 | 10/2000 |
| JP | A-2001-518206 | 10/2001 |
| JP | A-2002-221617 | 8/2002 |
| JP | A-2002-225259 | 8/2002 |
| KR | A 2003-0035892 | 5/2003 |
| WO | WO 98/43120 | 10/1998 |

\* cited by examiner

MICRO LENS AND FABRICATION METHOD OF MICRO LENS, OPTICAL DEVICE, OPTICAL TRANSMITTER, LASER PRINTER HEAD, AND LASER PRINTER

BACKGROUND OF THE INVENTION

1. Field of Invention

Exemplary aspects of the present invention relate to a micro lens and a fabrication method of a micro lens, and an optical device equipped with the micro lens, an optical transmitter, a laser printer head, and a laser printer.

2. Description of Related Art

Related art optical devices having a large number of minute lenses are called micro lenses. Such optical devices include, for example, a light-emitting device equipped with a laser, an optical interconnection of optical fibers, and further a solid imaging device having a condenser lens to condense incident light.

A micro lens constituting such an optical device can be formed by a forming process using a die and photolithography. See Japanese Unexamined Patent Publication No. 2000-35504.

Also, a liquid droplet ejection method being employed for a printer and the like may be used to form a micro lens in a minute pattern. See Japanese Unexamined Patent Publication No. 2000-280367.

SUMMARY OF THE INVENTION

However, the forming process using a die and photolithography requires a die and a complicated fabricating process to form a micro lens, and thus may be expensive. Also, it is difficult to form a micro lens of any arbitrary shape at any position.

Further, simple use of the liquid droplet ejection method facilitated forming a micro lens at any position, but controlling its shape to form any desired shape was difficult.

The present invention addresses the above-mentioned and/or other circumstances. Exemplary aspects of the present invention provide a micro lens which can freely control the shape and make good optical characteristics, such as a condenser function, and a fabrication method of a micro lens, an optical device, an optical transmitter, a laser printer head, and a laser printer.

A micro lens of an exemplary aspect of the present invention has a lens member formed by a liquid droplet ejection method, and includes: a base member formed on a substrate; and the lens member formed on the upper surface of the base member to which a lens material is ejected in a plurality of dots by the liquid droplet ejection method. The upper surface of the base member has a concavity and a convexity with at least a part of the upper surface of the base member being subjected to repellant treatment.

According to such a configuration, the lens member is formed on the base member, so that by forming the size and shape of the upper surface of the base member properly, it is possible to form the size and shape of the lens member. Further, at least a part of the upper surface of the base member is arranged to be treated with repellent. This enables a contact angle of the lens material, which is ejected and arranged, to be large relative to the upper surface of the base member, whereby the amount of lens material to be placed on the upper surface of the base member can be enlarged. In this case, when the lens material is placed on the upper surface of the base member, the repellent treatment may be applied such that the contact angle thereof becomes 20° or more. Also, the repellent treatment applied to the upper surface of the base member may very well cover the entire surface of the upper surface of the base member. Especially, treating the periphery of the upper surface of the base member with repellent is preferable. By applying the repellent treatment in this manner, the lens material will not drip off the base member, so that a lens member close to a spherical shape may be obtained.

By applying the repellent treatment to the upper surface of the base member, there is a possibility that the lens material formed thereon tends to peel off the base member. In an exemplary aspect of the present invention, the upper surface of the base member has a concavity and a convexity so that due to an increase in the surface area arising from the concavity and the convexity, a contact area between the lens member and the base member may increase. In addition, through contraction of the lens material, the concavity and the convexity are in close adhesion with the lens material, thereby making it possible to reduce the likelihood or prevent the lens member from peeling off the base member. As a result, it becomes possible to obtain a micro lens of high reliability.

Further, as described above, under a condition where the amount of the lens material to be placed on the upper surface of the base member is made to be considerable, the lens material is arranged to be ejected in a plurality of dots such that the size and the shape of the lens member to be obtained by properly adjusting the number of dots may be appropriately controlled. In this case, a scattering of the quantity of the lens material ejected from the plurality of dots relative to the set shape may be under 20%. Such arrangements reduce effects upon optical characteristics, thus enabling the shape of the lens member to be controllable through the settings of the quantity of a dot and the number of dots.

In an exemplary aspect of the present invention, the upper surface of the base member may be provided with convexities. Thus, it is possible for the lens member and the convexity to be in close adhesion due to contraction of the lens member, thereby making it difficult for the lens member to peel off the base member. In this case, the convexity of the lens member may be either one or a plurality, and by selecting the plurality, it is possible to strengthen the effect of reducing the likelihood or preventing the lens member from peeling off the base member.

In addition, a disengagement preventing device may be installed on the convexity of the upper surface of the base member. For the disengagement preventing device, a shape formed of a portion of a minimum cross-sectional area of the convexity and a portion of the convexity of a larger cross-sectional area than the minimum cross-sectional area which is above the portion of the minimum cross-sectional area relative to the upper surface of the base member may be used. Specifically, in a case of a reverse tapered shape, due to contraction of the lens member, the convexity meshes in with the lens member to reduce the likelihood or prevent peel-off. Not only the reverse taper-shaped convexity but also a shape such that it is thin in a manner of being constricted in the middle of the convexity may be acceptable. The same effect is obtainable so long as a portion having a large cross-sectional area is formed above a portion of the minimum cross-sectional area of the convexity relative to the upper surface of the base member.

Further, for the disengagement preventing device, it is preferable for at least a part of the convexity to be lyophilic. When the lens member and the convexity come into close adhesion with each other due to contraction of the lens material, this enhances close adhesion with the lyophilic part of the convexity, thereby reducing the likelihood or preventing the lens member from peeling off the base member.

As the disengagement preventing device, it is not limited to these. It is possible to have other shapes and surface treatments, which are capable of reducing the likelihood or preventing the lens member from disengaging from the convexity, such as the convexity having a concave and convex shape, and the convexity in tapered shape, part of which is lyophilic.

Still further, in an exemplary aspect of the present invention, the upper surface shape of the base member may be formed in the shape of a circle, an ellipse, or a polygon. If it is made into such shape, it is possible to form a lens member closer to a sphere, so that by forming its curvature appropriately, it is possible to adjust optical characteristics, such as condensing function.

Furthermore, in an exemplary aspect of the present invention, the base member may have transparency. In this way, in a case where a light source is placed on the base member side and used, light from this light source may properly emit from the upper surface side of the lens member, thus enabling the condensing function and the like to perform properly by the curvature and the like of the upper surface side.

A fabrication method of a micro lens according to an exemplary aspect of the present invention is a fabrication method of a micro lens having a lens member formed by a liquid droplet ejection method, including: forming on a substrate a base member having a shape of concavity and a convexity on a surface thereof; applying repellent treatment to at least a part of the upper surface of the base member; and ejecting a lens material in a plurality of dots by the liquid droplet ejection method to the upper surface of the base member and forming the lens member on the upper surface thereof.

According to the fabrication method of a micro lens, it is possible to fabricate easily and at low cost a micro lens, which can obtain the effects of exemplary aspects of the present invention, such as forming a micro lens of an appropriate size and shape at any position, adjusting the number of dots of the liquid droplet ejection method appropriately, and making it difficult for the lens member and the base member to peel off each other.

An optical device according to an exemplary aspect of the present invention includes a plane light-emitting laser and a micro lens, the micro lens being disposed at a light-emitting side of the plane light-emitting laser.

According to the present optical device, as mentioned above, since the micro lens whose size and shape are properly controlled is disposed at the light-emitting side of the plane light-emitting laser, it is possible to condense and the like, light emitted from the light-emitting laser. Consequently, it has proper light-emission characteristics (optical characteristics).

An optical transmitter according to an exemplary aspect of the present invention includes the optical device, a light receiving element, and a light transmission device to transmit light emitted from the optical device to the light receiving element.

According to the present optical transmitter, since it has an optical device having the proper light-emitting characteristics (optical characteristics) as mentioned above, it becomes an optical transmitter having the proper transmission characteristics.

A laser printer head according to an exemplary aspect of the present invention includes the optical device.

According to the present laser printer head, since it has an optical device having the proper light-emitting characteristic (optical characteristic) as mentioned above, it becomes a proper laser printer head having proper plotting characteristics.

A laser printer according to an exemplary aspect of the present invention includes the laser printer head.

According to the present laser printer, since it has a laser printer head having the proper plotting characteristics (optical characteristics) as mentioned above, the laser printer itself excels in plotting characteristics.

DETAILED DESCRIPTION OF EXEMPLARY EMBODIMENTS

Exemplary embodiments of the present invention will be described below with reference to the drawings.

Micro Lens

Figure 1:
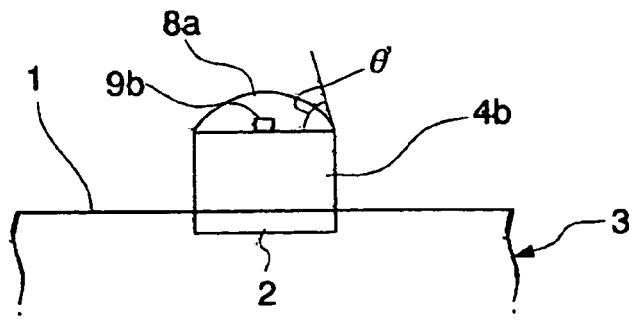
FIGS. 1(a) to (c) are schematics of micro lenses according to an exemplary aspect of the present invention.
Figure 1:
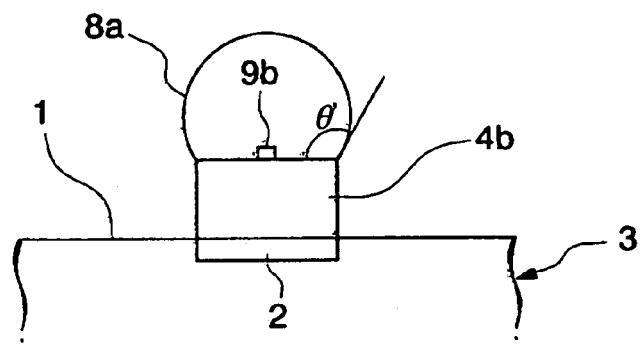
Figure 1:
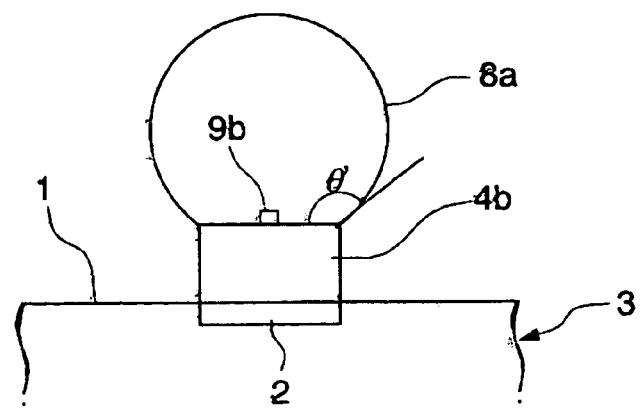

FIGS. 1(a)–1(c) show a micro lens of an exemplary embodiment according to the present invention, showing cross-sectional views of a principal part of a lens member 8a of various shapes. In FIGS. 1(a) to (c) are shown various shapes of the lens member, that is, a flat shape (FIG. 1(a)) through a shape whose side is close to a semi-sphere (FIG. 1(b)) to a shape whose side is close to a sphere (FIG. 1(c)).

In FIGS. 1(a) to (c), a substrate 3 has a surface capable of forming a base member 4b, specifically, a glass substrate, a semiconductor substrate, and further that which is formed of various functional thin films and functional elements. Also, as for the surface that can form the base member 4b, it may be a plane or a curved surface. Further, as for the shape of the substrate 3 itself, it is not limited to any particular shape, but various shapes may be adopted. In the present exemplary embodiment, as shown in FIG. 1(a), a GaAs substrate 1 is used, and that which is formed of a multiple of plane light-emitting lasers 2 on the GaAs substrate 1 is set as the substrate 3.

On the upper surface side of the substrate 3, specifically, on the surface that becomes a light-emitting side of the plane light-emitting laser 2, there is formed the base member 4b. It should be noted that in the vicinity of a light-emitting port of the plane light-emitting laser 2, there is formed an insulating layer (un-illustrated) including a polyimide resin and the like. As a forming material of the base member 4b, a material having transparency, specifically, a material hardly absorbing light in a wavelength region of emitted light from the light source, hence, virtually permitting the emitted light to pass through, may be used. For example, a polyimide resin, an acryl resin, an epoxy resin, or a fluoride resin is suitably used. Especially, the polyimide resin is more suitably used. In the present exemplary embodiment, as the forming material of the base member 4b, a polyimide resin is used.

In FIGS. 1(a) to (c), on the upper surface of the base member 4b including the polyimide resin, there is formed a convexity 9b. As a material forming the convexity 9b, a material having the same transparency as the base member 4b is used, and likewise, in the working example, it is formed of the polyimide resin.

On the base member 4b including the convexity 9b, there is formed a lens member 8a. As this lens material, a light-transparent resin is used. Specifically, there are cited an acryl resin, such as polymethyl methacrylate, and polyhydroxyethyl methacrylate, polycyclohexyl methacrylate, an acryl resin such as polydiethyleneglycolbisaryl carbonate, and polycarbonate, a methacylate resin, a polyurethane resin, a polyester resin, a polyvinylchloride resin, a polyvinylacetate resin, a cellulose resin, a polyamide resin, a fluororesin, a polypropylene resin, a polystyrene resin, and other thermoplastic or heat curing resins. Of these, one kind or a plurality of kinds are mixed and used.

Further, in as exemplary aspect of the present invention, as a lens material, especially that which is non-solvent type, is suitably used. Without undergoing a process of dissolving a light-transparent resin by using an organic solvent to turn it into a liquid state, the light-transparent resin of the non-solvent type is, for example, subjected to dilution with its monomer to produce a liquid state, thus enabling it to be ejected from the liquid droplet ejection device. Still further, this light-transparent resin of the non-solvent type is arranged such that by blending a photopolymerization initiator, such as a biimidazole compound, it may be used as a radiation irradiating curing type. Specifically, by blending such photopolymerization initiator, the radiation irradiating curing property may be provided to the light-transparent resin. In this context, radiation is the general nomenclature of a visible ray, an ultraviolet ray, a far ultraviolet ray, an x ray, an electronic ray and the like, and, particularly, the ultra violet ray is generally used.

A surface tension of the light-transparent resin may be in a range of 0.02 N/m or more and 0.07 N/m or less. When ejecting ink by means of the liquid droplet ejection method, if the surface tension is less than 0.02 N/m, the ink's wettability relative to a nozzle surface increases, so that a flying curve tends to occur. Whereas, if the surface tension exceeds 0.07 N/m, the shape of a meniscus at the nozzle tip becomes unstable, thus making it difficult to control the ejection quantity and ejection timing. To adjust the surface tension, a minute quantity of a surface tension regulator, such as a fluorine type, a silicon type, and a nonionic type may well be added to the above-mentioned liquid dispersant to an extent where there is no appreciable drop of its contact angle with the substrate without affecting optical characteristics, such as the refractive index. The nonionic surface tension regulator is conducive to enhancing wettability to the ink, enhancing the leveling property of a film, and reducing or preventing minute concavities and convexity of a film from generating. The surface tension regulator may include, as necessary, an organic compound, such as alcohol, ether, ester, and ketone.

The viscosity of the light transparent resin may be in a range of 1 mPa·s or more and 200 mPa·s or less. When ejecting ink by means of the liquid droplet ejection method, if the viscosity is less than 1 mPa·s, the periphery of the nozzle tends to be soiled by an outflow of the ink. Whereas, if the viscosity exceeds 200 mPa·s, ejection is made possible by setting up an ink heating mechanism at the head or the liquid droplet ejection device. But in normal temperatures, the frequency of clogging nozzle holes increases, thus making it difficult to eject liquid droplets smoothly. In case of over 200 mPa·s, it is difficult to drop viscosity to a level of ejecting liquid droplets even by heating.

In FIGS. 1(a) to (c), at least a part of the upper surface of the base member 4b has been treated with repellent. This repellant treatment may be over the entire upper surface of the base member 4b. As described later, it may be the upper surface of the base member 4b excluding the convexity 9b or the periphery of the upper surface of the base member 4b. In the present working example, the entire upper surface of the base member 4b excluding the convexity 9b has been treated with the repellent.

In this manner, by treating the upper surface of the base member 4b with the repellent, a contact angle on the upper surface of the base member 4b with the lens material ejected by the liquid droplet ejection device becomes large, so that it becomes possible to eject an appropriate quantity of the lens material on the base member 4b and shape the lens member 8a into an appropriate size and shape.

At this point, as the repellent treatment, for example, a plasma processing method ($CF_4$ plasma processing method) which uses tetrafluoromethane as processing gas in the atmosphere is suitably employed. Conditions for this $CF_4$ plasma processing are, for example, a plasma power of 50 to 1000 kW, a tetrafluoromethane ($CF_4$) gas flow rate of 50 to 100 ml/min, a conveying speed of the substrate 3 relative to a plasma ejection electrode of 0.5 to 1020 mm/sec, and a substrate temperature of 70 to 90° C. It should be noted that the processing gas is not limited to tetrafluoromethane ($CF_4$), while other fluorocarbon gases may be used.

Also, it is acceptable to form a fluoroalkylsilane film on the base member 4b by putting the substrate 3 forming the base member 4b and fluoroalkylsilane into a hermetically sealed vessel and heating it for 2 hours at 120° C.

By performing such repellent treatment, a fluorine radical is introduced into a resin which constitutes the upper surface of the base member 4b, thereby providing high repellency. In regard to such repellent treatment, especially when arranging the lens material to the plane formed with the forming material of the base member 4b, it may be carried out such that repellency to make the contact angle of the lens material at 20° or more is brought into play.

Figure 2:
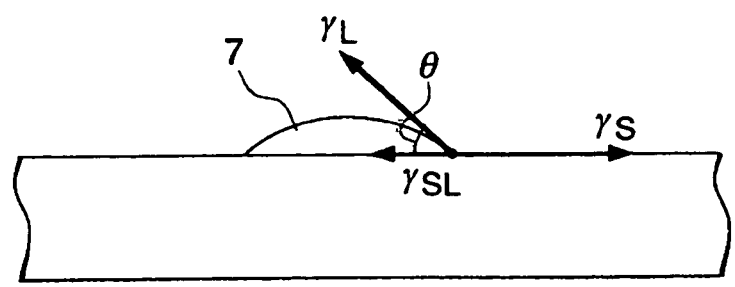
FIG. 2 is a schematic to explain a contact angle of a lens material due to repellent treatment.

Next, effect of the repellent treatment will be described based on FIG. 2. As shown in FIG. 2, a base member material layer 4 is formed of a forming material (a polyimide resin in this example) of the base member 4b, and its surface is set flat. And to this surface, the above-mentioned repellent treatment is applied. Next, onto this surface, the lens material 7 is ejected by the liquid droplet ejection method.

Then, the lens material 7 becomes a liquid droplet of a shape corresponding to the wettability relative to the surface of the base member material layer 4. At this time, if a surface tension of the base member material layer 4 is γS, a surface tension of the lens material 7 is γL, an interfacial tension between the base member material layer 4 and the lens material 7 is γSL, and a contact angle of the lens material 7 relative to the base member material layer 4 is θ, the following formula holds among γS, γL, γSL, and θ.

$$\gamma S = \gamma SL + \gamma L \cdot \cos \theta$$

Curvature of the lens material 7 which becomes a lens member 8a is restricted by the contact angle θ as determined by the foregoing formula. Specifically, the curvature of a lens obtained after hardening the lens material 7 is one of the elements which determine the shape of the final lens member 8a. Consequently, so that the shape of the lens member 8a obtained according to an exemplary aspect of the present invention may be close to a spherical shape, it is preferable to enlarge the contact angle θ, that is, 20° or more, by increasing the interfacial tension between the base member material layer 4 and the lens material 7 through the repellent treatment.

Figure 3:
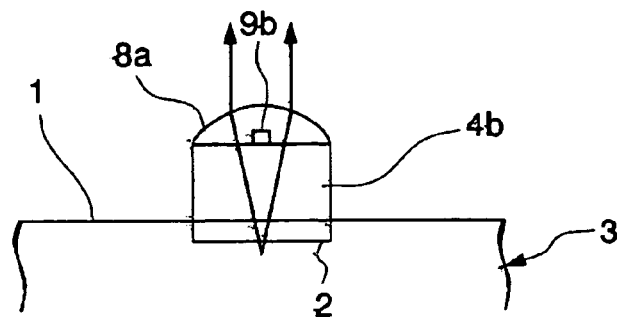
FIGS. 3(a) to (c) are schematics to explain a condensing function of a micro lens.
Figure 3:
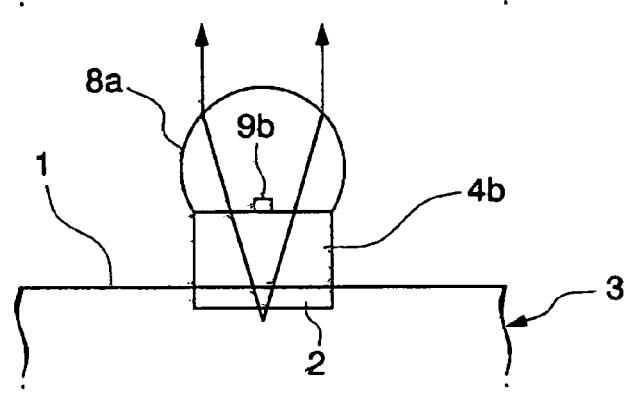
Figure 3:
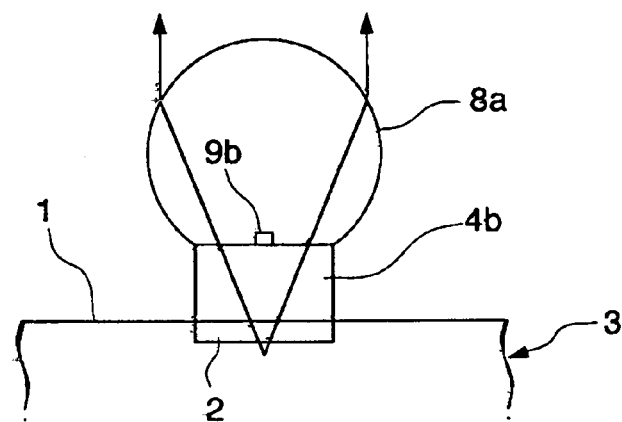

In this manner, by applying the repellent treatment under conditions, such as to make the contact angle θ shown in FIG. 2 to become 20° or more to the upper surface of the base member 4b which is shown in FIGS. 3(a) to (c), as described later, there will surely be an increase in a contact angle θ' of the lens material, which is ejected and disposed at the upper surface of the base member 4b, relative to the upper surface of the base member 4b. Consequently, there may more of the quantity of the lens material to be placed on the upper surface of the base member, thus making it easy to control its shape by the ejection quantity (quantity of dots ejected). Especially, in this case, by keeping the scattering of the ejected quantity under 20%, it is possible to form into an appropriate shape a micro lens which has greatly diminished effects upon its optical characteristics by setting the quantity of dots and the number of dots.

Specifically, in a case where there is a small ejection quantity of the lens material 7, under the condition of spreading over the entire upper surface of the base member 4b as shown in FIG. 1(a), there is no big bulge as a whole, and the contact angle θ' becomes an acute angle.

If ejection of the lens material 7 is further continued from this condition, the lens material 7 ejected later has naturally high adhesion to the lens material 7 ejected in advance, so that as FIG. 1(b) shows, it does not spill over, but is held in one integral unit. Then, this integrated lens material 7 increases in volume and bulges, thus causing the contact angle θ' relative to the upper surface of the base member 4b to broaden and finally cross the right angle as shown in FIG. 1(b).

In FIGS. 1(a) to (c), although the repellent treatment has been applied to over the base member 4b, the convexity 9b is not subject to repellent treatment. When the lens material shrinks and hardens, the sticking property between the convexity 9b and the lens member 8a is enhanced, reducing the likelihood or preventing the lens member 8a from peeling off the base member 4b. Especially, in the case where the convexity 9b is not treated with the repellent as mentioned above, the adhesion between the lens member 8a and the convexity 9b is further enhanced, preventing the lens member 8a from peeling off the base member 4b.

In the case of the present exemplary embodiment, emitted light (light-emitting light) from the plane light-emitting laser 2 formed on the substrate 3 passes through the base member 4b and is emitted from an opposite side to the base member 4b, specifically, the upper surface side of the lens member 8a. As shown in FIGS. 1(a) to (c), since the curvature on the upper surface side of this lens member 8a may be adapted as one considers appropriate, it is possible to adjust in a manner of having predetermined the condensing function of this lens member 8a.

Consequently, for example, in a case where the emitted light (light-emitting light) from the plane light-emitting laser 2 passes through the base member 4b as radiation light and enters the lens member 8a, by forming the shape of the lens member 8a in advance according to the degree of radiation of the radiation light, specifically, such that the curvature of the upper surface side of the lens member 8a becomes a predetermined curvature, the radiation light from the plane light-emitting laser 2 (emitted light) may be condensed, for example, as shown in FIGS. 3(a) to (c), properly by the lens member 8a.

Also, conversely, in a case where light from a light source, such as the plane light-emitting laser 2 has a property of traveling straight without radioactive property, by permitting it to pass through the lens member 8a, it is possible to endow this transparent light with radioactive property.

Figure 4:
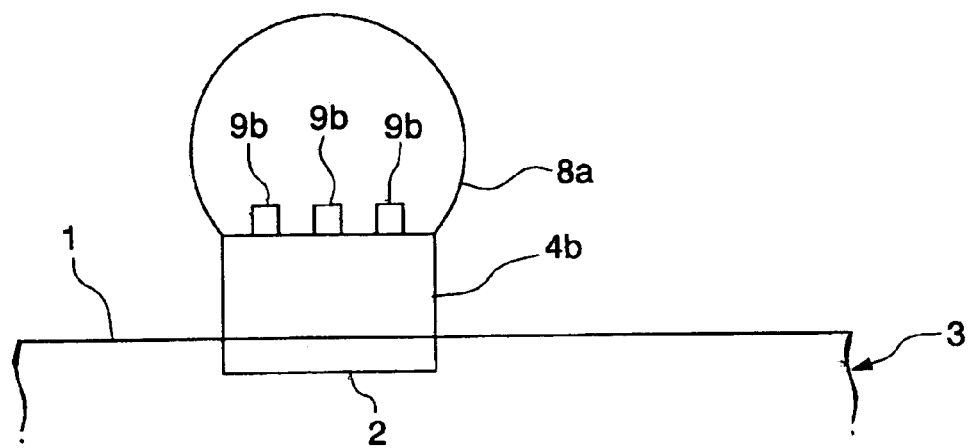
FIG. 4 is a schematic of a micro lens of a working example according to an exemplary aspect of the present invention.
Figure 5:
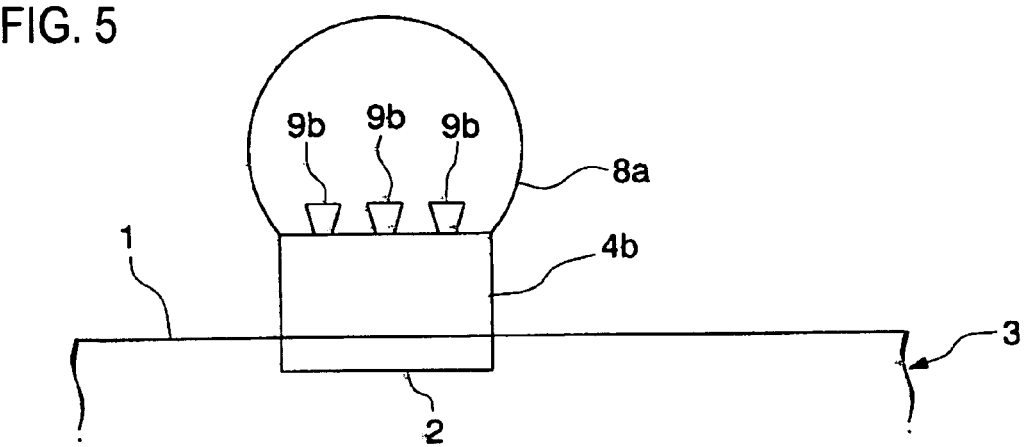
FIG. 5 is a schematic of the micro lens of another working example according an exemplary aspect of the present invention.

FIGS. 4 and 5 show other exemplary embodiments of the present invention. FIG. 4 is a working example where three convexity 9b are formed on the base member 4b. FIG. 5 shows a configuration where a cross-sectional area of the upper surface of the convexity 9b is larger than a cross-sectional area (a horizontal plane parallel to the upper surface of the base member 4b) of the convexity 9b on the upper surface side of the base member 4b, specifically, a working example where three convexities 9b have a reverse tapered shape. In FIGS. 4 and 5, the same component elements as FIGS. 1(a)–1(c) have the same reference numerals.

In FIG. 4, three convexities 9b are formed on the base members 4b, and it is possible to raise strength further against peel-off between the lens members 8a and the base members 4b. In FIG. 5, the convexities 9b on the base members 4b are formed in the reverse tapered shape such that the convexities 9b of the reverse tapered shape are engaged with the lens members 8a, thus making it impossible for the lens members 8a to peel off the base members 4b. In this way, the formation of the convexities 9b is possible by, for example, photolithography described later. The number and position of the convexities 9b may be formed by making a mask for use in the shape of a necessary pattern. Also, the convexities 9b in a reverse tapered shape are, for example, possible by photolithography: when etching a polyimide resin, which is a convexity material, by using photoresist as a mask, its formation is possible by over-etching.

Figure 6:
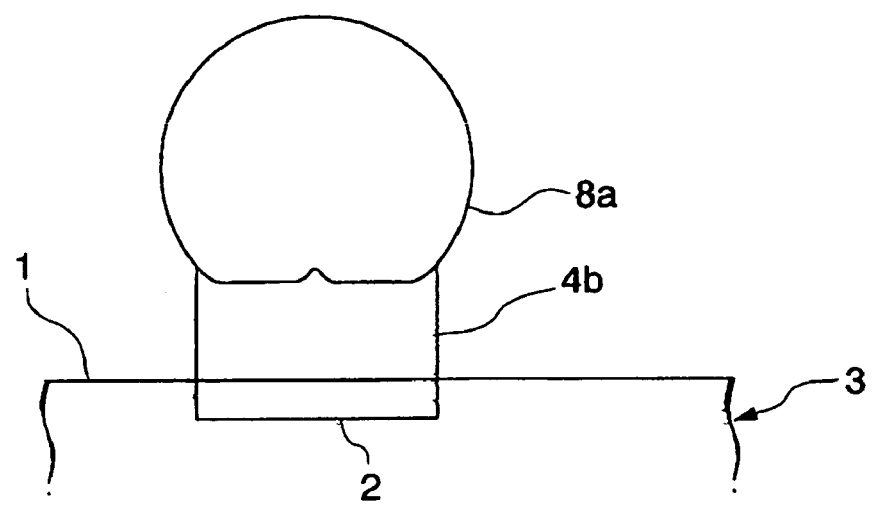
FIG. 6 is a schematic of a micro lens of still another working example according to an exemplary aspect of the present invention.

FIG. 6 is another exemplary embodiment of the convexity and concavity according to the present invention, the upper surface of the base member 4b having convex and concave shapes for formation. The base member 4b is, as mentioned above, upon formation of the base member material layer on the substrate 3 as mentioned above, subjected to heat treatment and hardened. A working example of FIG. 6 shows that by setting hardening conditions at the time of hardening this base member 4b, a concavity is formed, not on its flat surface, but in the periphery and center thereof. Even in this shape, likewise, it is possible to shape the lens member 8a in any desired shape, and it is also possible to reduce the likelihood or prevent the base member 4b from peeling off the lens member 8a.

Micro Lens Fabrication Method

Next, a micro lens fabrication method according to an exemplary aspect of the present invention will be described.

The micro lens fabrication method according to an exemplary aspect of the present invention includes: forming on the substrate a base member having convexity and concavity on its upper surface; subjecting at least a part of the upper surface of the base member to the repellent treatment; and ejecting a lens material in a plurality of dots to the upper surface of the base member by the liquid droplet ejection method, thereby forming a lens member on the base member.

Figure 7:
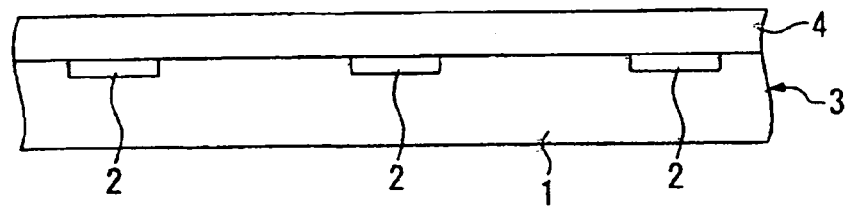
FIGS. 7(a) to (e) are schematics showing a fabrication process of a base member of the micro lens according to an exemplary aspect of the present invention.
Figure 7:
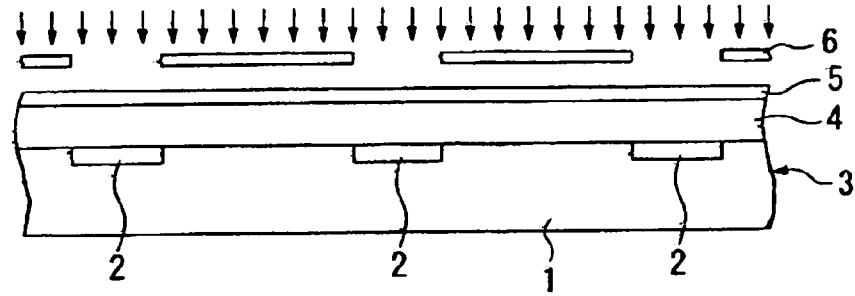
Figure 7:
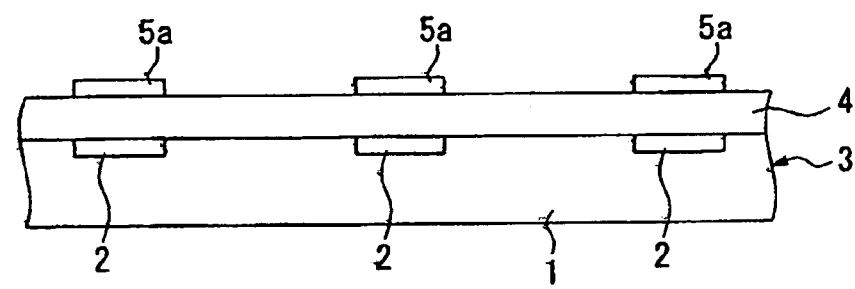
Figure 7:
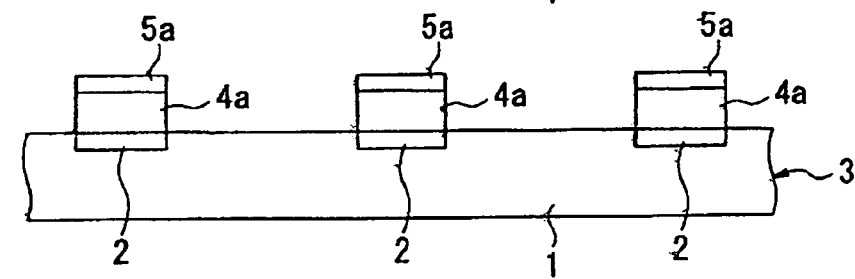
Figure 7:
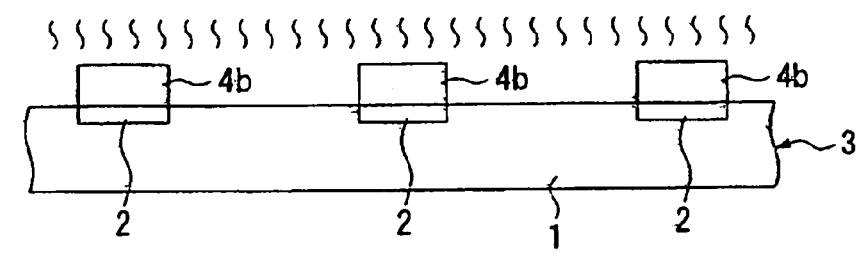
Figure 8:
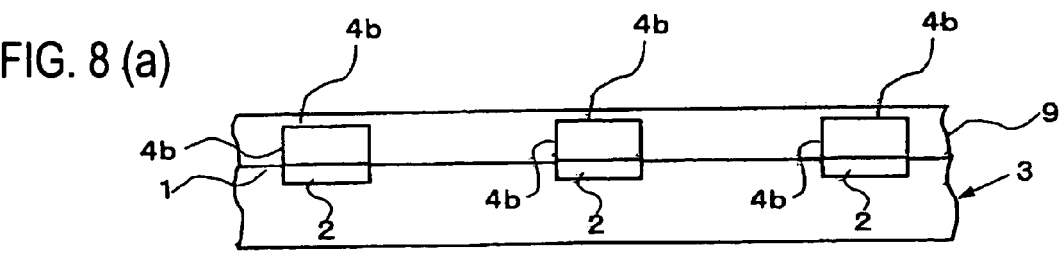
FIGS. 8(a) to (e) are schematics showing a fabrication process of convexities on an upper surface of base members of a micro lens according to an exemplary aspect of the present invention.
Figure 8:
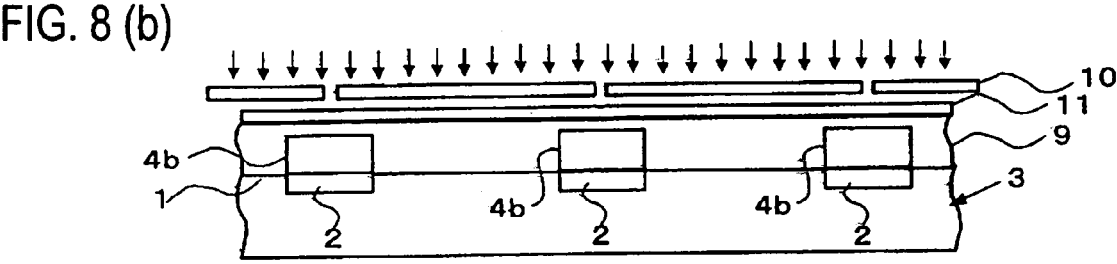
Figure 8:
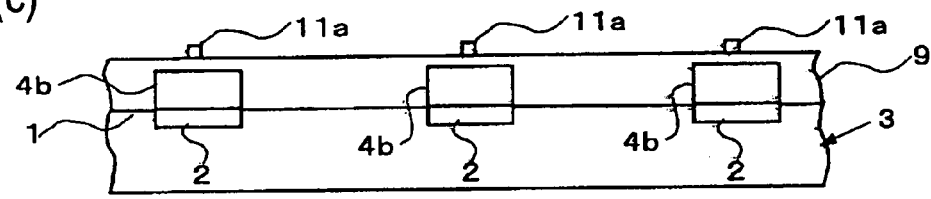
Figure 8:
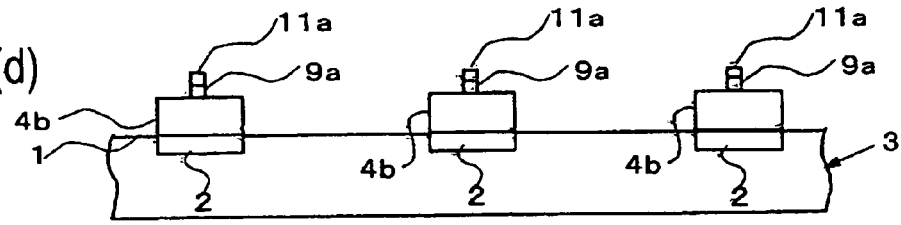
Figure 8:
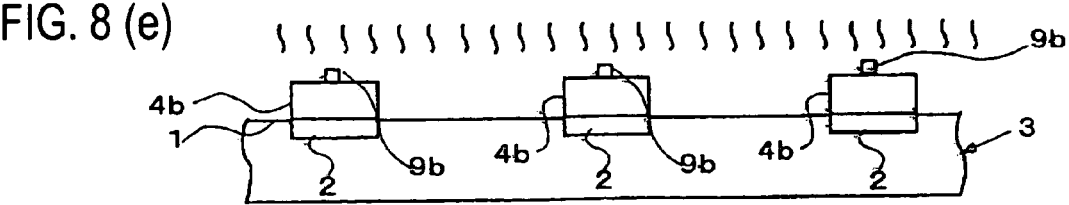
Figure 9:
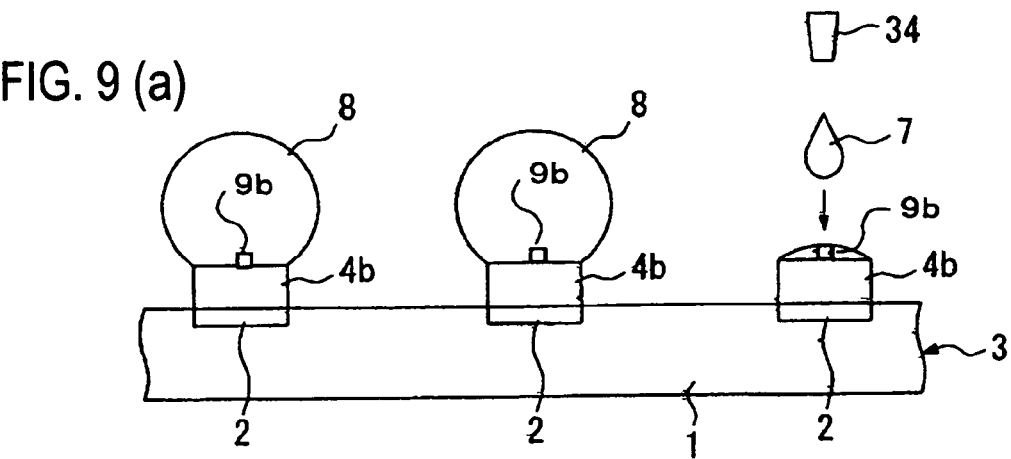
FIGS. 9(a) and (b) are schematics showing the fabrication process of lens members of the micro lens according to an exemplary aspect of the present invention.
Figure 9:
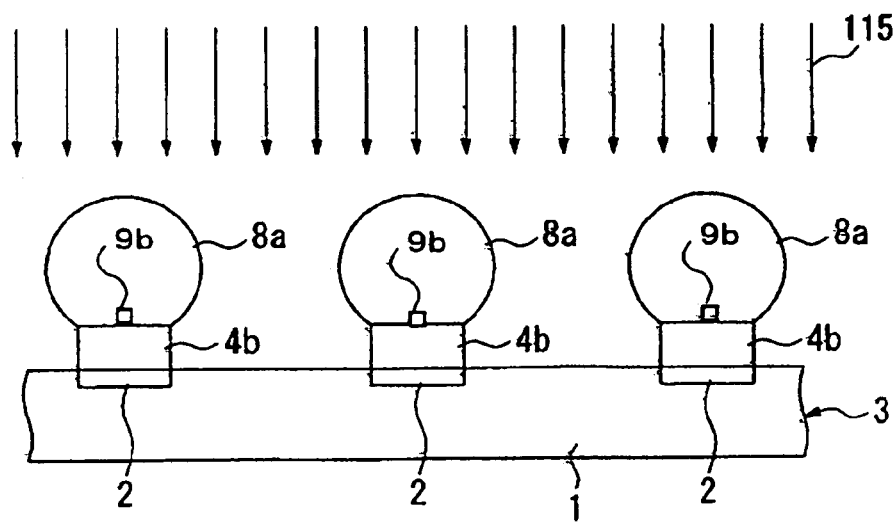

FIGS. 7(a) to (e) show forming the base members 4b on the substrate 3, FIGS. 8(a) to (e) show forming convexity 9b on the base members 4b formed according to the step in FIG. 7, and FIGS. 9(a) and (b) show forming the lens members 8a on the base members 4b.

In FIG. 7(a), for example, that which uses a GaAs substrate 1 with formation of a large number of plane light-emitting lasers 2 thereon is prepared as the substrate 3. And, on the upper surface side of the substrate 3, specifically, on a surface which will be a light-emitting side of the plane light-emitting lasers 2, as a forming material of the base member, for example, a polyimide resin is coated, and thereafter is treated with heating at approx. 150° C., whereby the base member material layer 4 is formed. It should be noted that as for this base member material layer 4, sufficient hardening is not permitted to proceed at this stage, but a hardness enough to hold its shape remains.

After the base member material layer 4 including the polyimide resin is formed in this manner, a photoresist layer 5 is formed on this base member material layer 4 as shown in FIG. 7(b). Then, the photoresist layer 5 is subjected to exposure by using a mask 6 forming a prescribed pattern, and further to development, photoresist patterns 5a are formed as shown in FIG. 7(c).

Next, with the photoresist patterns 5a as a mask, for example, by wet etching using an alkali solution, the base member material layer 4 is patterned. By this, a base member pattern 4a is formed on the substrate 3 as shown in FIG. 7(d). At this point, as for the base member patterns 4a to form, it is preferable in terms of forming a lens member on the base members 4a that a circular, elliptic, or polygonal shape is formed on this upper surface shape. In the present exemplary embodiment, the upper surface is circular. Also, it is formed such that a central position of the upper surface of such circular shape is placed directly above a light-emitting port (un-illustrated) of the plane light-emitting laser 2 formed on the substrate 3.

Thereafter, as shown in FIG. 7(e), the photoresist patterns 5a are removed, and heat treatment at 350° C. is performed, whereby the base member patterns 4a are sufficiently hardened to form the base members 4b. Next, on the upper surface of this base members 4b, there is carried out the repellent treatment according to the above-mentioned method.

Next, formation of the convexities 9b as shown in FIGS. 8(a) to (e) is, like the formation of the base members 4b in FIGS. 7(a) to (e), by photolithography. In FIG. 8(a), a convexity material layer 9, which is a polyimide resin, is formed on the substrate 3 on which the base members 4b have been formed. In FIG. 8(b), a photoresist layer 11 is formed, and the photoresist layer 11 is exposed and developed by a mask 10, and photoresist patterns 11a of FIG. 8(c) are formed. Next, etching is carried out with the photoresist patterns 11a as a mask and convexity patterns 9a of FIG. 8(d) are formed. At this point, as mentioned above, the base members 4b are hardened with heat treatment in FIG. 7(e). Although the convexity material layer 9 which is the polyimide resin of FIG. 8(a) is heat treated, it has sufficient hardness to hold its shape. Consequently, when etching the convexity material layer 9 with the photoresist patterns 11a as the mask, it is possible not to subject the base members 4b to etching but to subject only the convexity material layer 9 to selective etching.

Next, the photoresist patterns 11a are removed, the heat treatment is performed, and the convexities 9b of FIG. 8(e) are formed.

As described above, by forming the base member 4b and the convexities 9b, the upper surface of the base members 4b are subjected to the repellent treatment, while the convexities 9b are not subjected to the repellent treatment and remain in the lyophilic state. As the upper surface of the base members 4b is treated with repellent, as mentioned later, a contact angle of the lens material to be ejected and placed on the upper surface of the base member 4b relative to the upper surface of the base members 4b becomes large. Consequently, there may be more of the quantity of the lens material to be placed on the upper surface of the base members, thus making it easy to control its shape by the ejection quantity (quantity of dots ejected).

Also, the convexities 9b are lyophilic. When the lens member is formed on the upper surface of the base members 4b as mentioned later, the lens member and the convexity come into close adhesion with each other due to contraction of the lens material. At the same time, since the convexity 9b are lyophilic, it becomes possible to increase close adhesion between the convexity 9b and the lens member. As a result, it becomes possible to reduce the likelihood or prevent the lens member from peeling off the base members 4b.

After the convexities 9b are formed on the base members 4b in this manner, as shown in FIG. 9(a), the lens material 7 is ejected in a plurality of dots onto the base members 4b by the liquid droplet ejection method. At this point, as the liquid droplet ejection method, a dispenser method, an inkjet method and the like may be adopted. The dispenser method is a typical method of ejecting liquid droplets which is highly effective in ejecting liquid droplets over a relatively wide region. The inkjet method is a method of ejecting liquid droplets by using an inkjet head, capable of controlling a liquid droplet ejected position by a unit of the order of μm. Also, it can control the quantity of liquid droplet to be ejected by the unit of the order of pico liter, so that it is suited particularly to the fabrication of minute lenses (micro lenses).

Figure 10:
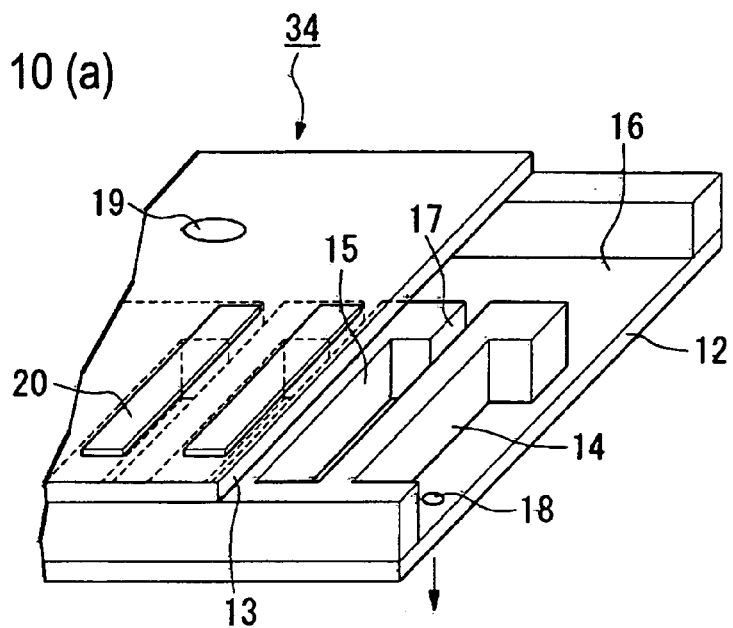
FIGS. 10(a) and (b) are schematics of an inkjet head.
Figure 10:
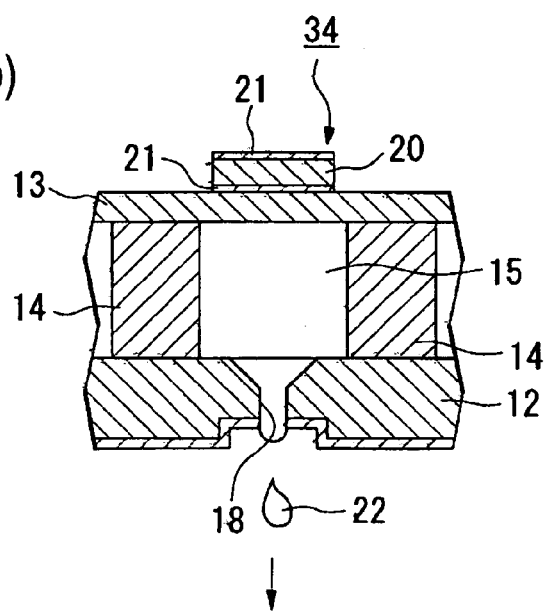

Now, in the present exemplary embodiment, the inkjet method will be used as the liquid droplet ejection method. This inkjet method is provided, as an inkjet head 34, for example, with a stainless steel-made nozzle plate 12 and a vibration plate 13 as shown in FIG. 10(a), both being joined through a reservoir plate 14. In between the nozzle plate 12 and the vibration plate 13, there are formed a plurality of cavities 15 and a reservoir 16 by the reservoir plate 14, and these cavities 15 and the reservoir 16 communicate through a watercourse 17.

The inside of each cavity 15 and the reservoir 16 is designed to be filled with liquid matter (lens material) for ejection. The watercourse 17 between these functions as a supply port to supply the liquid matter from the reservoir 16 to the cavity 15. Also, in the nozzle plate 12, there are formed a plurality of nozzles 18, arrayed longitudinally and transversely, in the shape of apertures from which to eject the liquid matter from the cavity 15. A hole 19 opening inside the reservoir 16 is formed on the vibration plate 13, and to this hole 19 is connected a liquid matter tank (un-illustrated) through a tube (un-illustrated).

Also, onto a surface of an opposite side to a surface facing the cavity 15 of the vibration plate 13, a piezoelectric element 20 is jointed as shown in FIG. 10(b). This piezoelectric element 20 is grasped between a pair of electrodes 21 and 21, flexing as if protruding to the outside as electricity is turned on, while the vibration plate 13 to which the piezoelectric element is jointed simultaneously flexes to the outside integrally with the piezoelectric element 20. This causes the volume of the cavity 15 to increase and the inside of the cavity 15 communicates through the inside of the reservoir 16. In a case where the inside of the reservoir is filled with the liquid matter, the liquid matter equivalent to an increased portion of the volume enters into the cavity 15 from the reservoir 16 through the watercourse 17.

Now, when electricity from this state to the piezoelectric element 20 is turned off, the piezoelectric element 20 and the vibration plate 13 return to the original shapes. Hence, the cavity 15 returns to the original volume, whereby pressure of the liquid matter inside the cavity 15 rises to eject a liquid droplet 22 from the nozzle 18.

It should be noted that as an ejection device of the inkjet head, a method other than an electric-mechanical converter using the piezoelectric element 20 is acceptable. For example, there may be employed a method of using an electric heat converter as an energy generating element, a ejecting control method, a continuous method, such as a pressurized vibration type, an electrostatic suction method, and further a method of irradiating an electromagnetic wave, such as a laser, generating heat, and ejecting the liquid matter with an action due to this generated heat.

Such a lens material 7 is ejected by the inkjet head 34 of the above-mentioned construction in a plurality of dots, for example, 30 dots onto the base member 4b as shown in FIG. 9(a) and forms lens member precursors 8 on the base members 4b. At this point, as a result of ejecting the lens material 7 by the inkjet method, the lens material 7 may be placed in substantially the center above the base member 4b. Also, as mentioned above, as a result of subjecting the upper surface of the base member 4b to the repellent treatment, the liquid droplet of the lens material 7 ejected tends to be difficult to get wet and spread on the upper surface of the base member 4b, so that the lens material 7 placed on the base member 4b is such that it may not spill over from the base member 4b to be held in a stable condition on the base member 4b. Also, as a result of ejecting several dots (30 dots in this example) intermittently, it becomes possible to form the lens member precursor 8 consisting of this ejected lens material 7 in a shape close to a sphere as in FIG. 9(a).

In this manner, the upper surface of the base member 4b is treated with the repellent, and by arranging the lens material 7 in a plurality of dots by the inkjet method (liquid droplet ejection method) which is able to eject a minute quantity of a dot with good precision in terms of quantity and ejection position on the surface subjected to the repellent treatment, it is possible to make different shapes from that having relatively a small acute angle to that having a large obtuse angle for the contact angle. Specifically, by predetermining the number of dots for ejection to match the shape of the lens member as one considers appropriate, it is possible to form the lens member precursor 8 of a desired shape.

After the lens member precursor 8 of the desired shape is formed in this manner, the lens member precursor 8 is hardened as shown in FIG. 9(b) and the lens members 8a are formed. As a hardening treatment of the lens member precursor 8, as mentioned above, no organic solvent is added as the lens material 7. Since that which is provided has a radiation irradiating hardening property, a treating method through irradiation of an ultraviolet ray (wavelength $\gamma$=365 nm) 115 is suitably used.

Also, after such hardening treatment through irradiation of the ultraviolet ray 115, it is desirable to carry out heat treatment, for example, at 1000° C. for about 1 hour. By carrying out such heat treatment, even if irregular hardening should occur at the stage of hardening treatment through irradiation of the ultraviolet ray 115, it is possible to decrease the irregular hardening to bring about the degree of substantially uniform hardening as a whole. Further, through heat treatment, the lens members 8a undergo a slight contraction, further increasing the close adhesion between the convexities 9b and the lens members 8a on the base members 4b, and reducing the likelihood or preventing the lens members 8a from peeling off the base members 4b.

Still further, from the lens members 8a fabricated in this manner and the plane light-emitting lasers 2 pre-formed on the substrate 3, there is obtained an optical device which becomes one exemplary embodiment according to the present invention.

Figure 11:
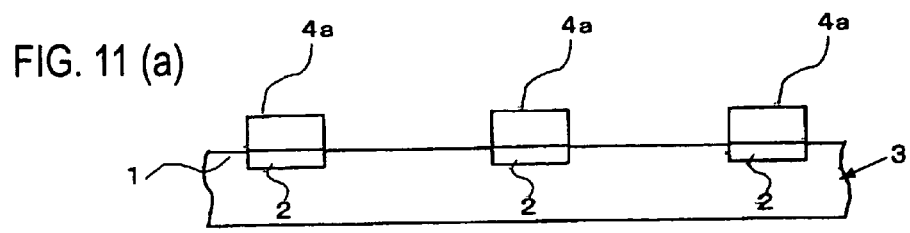
FIGS. 11 (a) to (e) are schematics showing the fabrication process of convexities on an upper surface of other base members of the micro lens according to an exemplary aspect of the present invention.
Figure 11:
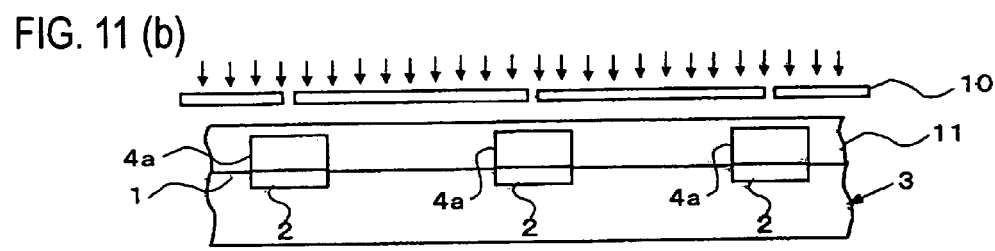
Figure 11:
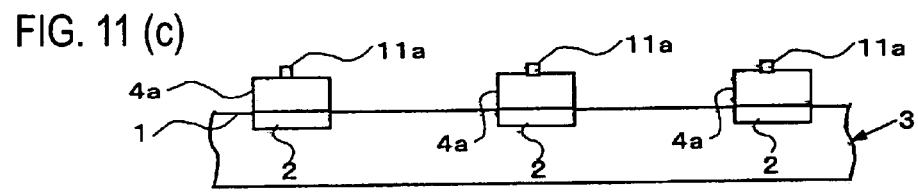
Figure 11:
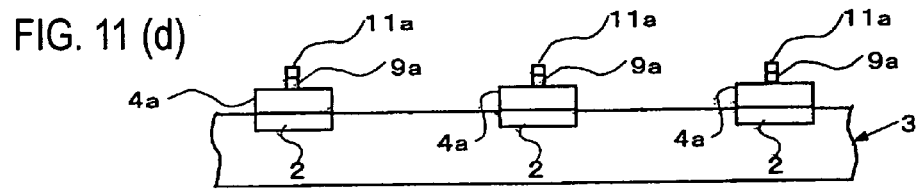
Figure 11:
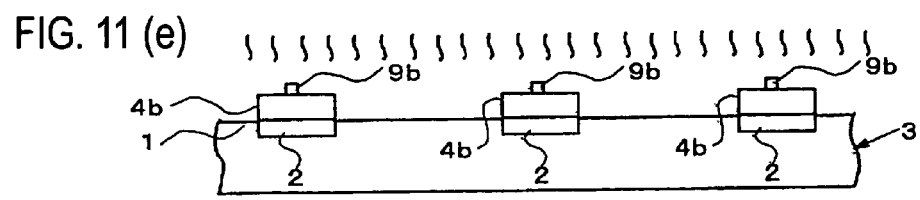

FIG. 11(a) to (e) show other forming methods of the convexities 9b on the base members 9b. After the base members 4b are formed on the substrate 3 as in FIG. 7(a) to (d), the photoresist patterns 5a are removed as in FIG. 7(e) and without carrying out heat treatment, the base member pattern 4a is formed as shown in FIG. 11(a). Formation of the convexity 9b in FIG. 11(b) to (e), too, shows an example of forming using photolithography like the formation of the convexities 9b of FIG. 8(a) to (e).

Next, a photoresist layer 11 is formed as shown in FIG. 11(b). After forming the photoresist layer 11, the photoresist layer 11 is exposed and developed by the mask 10 forming the convexities and photoresist patterns 11a shown in FIG. 11(c) are formed.

Next, etching is carried out on the base members 4a with the photoresist patterns 11a as a mask as shown in FIG. 11(d). When carrying out this etching, etching is not performed on everything relative to the thickness direction of the base members 4a, but for a thickness of the base members 4a of the same height corresponding to the height of a desired convexity. And as in FIG. 11(d), the convexity patterns 9a are formed, and the base members 4a have thickness reduced but remain on the substrate 3. In this condition, the repellent treatment of the upper surface of the base members 4a is performed.

Next, after removing the photoresist patterns 11a, the heat treatment is carried out in FIG. 11(e) and the base members 4b and the convexities 9b are formed. At this point, when treating the upper surface of the base members 4a, the surface of the convexities 9a is covered with the photoresist patterns 11a. Consequently, the upper surface of the convexities 9a has lyophilic property. The upper surface of the base members 4a and the side of the convexities 9a are in the condition in which the repellent treatment was carried out.

In the forming method of the base members 4b and the convexities 9b shown in FIGS. 11(a) and (b), too, the same micro lens may be fabricated by carrying out the same forming method of the lens members 8a of FIGS. 9(a) and (b). In this case, the upper surface of the base members 4b is treated with the repellent, so that it is possible to form the lens members 8a of a desired shape. Also, the convexities 9b are formed having a lyophilic upper surface, so that the lens members 8a are formed such that it is difficult for them to peel off the base members 4a. Also, in the fabrication method including formation of the convexities 4b according to FIGS. 11(a) to (e), it is possible to shorten the fabrication process as compared to the fabrication method including formation of the convexities 4b according to FIGS. 7(a) to (e).

Now, in the above-mentioned exemplary embodiment, the base member material layer 4 is formed on the substrate 3, so that the base members 4b are formed from the base member material layer 4 and the convexities 9b in the same way. The present invention is not limited to this. For example, in a case where a surface layer part of the substrate 3 is formed of a transparent material, the base members and the convexities may be formed on this surface layer part.

Also, as for the forming method of the base members 4b and the convexities 9b, it is not limited to that which is based on the above-mentioned photolithography and the hardening method of the polyimide resin, while other forming methods, for example, a selective growth method, an imprint method and the like may be employed. Further, making the surface of the base members 4b coarse through etching and the like to form the concavity and convexity is acceptable.

Still further, as for the upper surface shape of the base member 4b, too, corresponding to the characteristic required of a micro lens to be formed, it is possible to make various shapes, such as a triangle and a square. Furthermore, as for the shape of the base members 4b themselves, too, it is possible to make various shapes, such as a tapered type and a reverse tapered type.

Moreover, in the above-mentioned exemplary embodiment, the lens members 8a ware designed such that while they were formed on the base members 4b, they could be used and function as the micro lens. The present invention is not limited to that. It may be such that they are separated from or peeled off the base members 4b by some appropriate method to enable the lens members 8a to be used as an independent optical part. In that case, as for the base member 4b to be used for fabrication, naturally, they do not need to be transparent.

Optical Transmitter

Further, in an exemplary aspect of the present invention, in addition to the optical device including the above-mentioned plane light-emitting laser 2 and the micro lens including the lens member 8a, it is possible to cause it to function as an optical transmitter by providing an optical transmission means made up of an optical fiber, an optical waveguide and the like, and a light-receiving element receiving light transmitted by this optical transmission means.

Since such optical transmitter is equipped with the optical device having proper light-emitting characteristics (optical characteristics) as described above, this optical transmitter has proper transmission characteristics.

Laser Printer Head and Laser Printer

Figure 12:
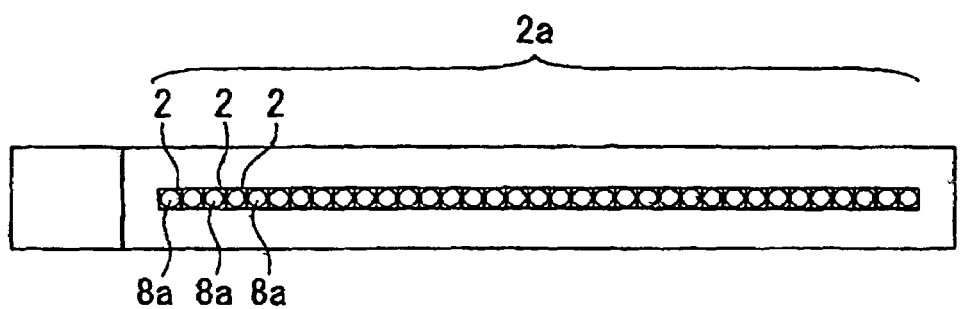
FIG. 12 is a schematic of a laser printer head according to an exemplary aspect of the present invention.

A laser printer head according to an exemplary aspect of the present invention is provided with the optical device. Specifically, the optical device used for this laser printer head includes a plane light-emitting laser array 2a made up of a multiplicity of plane light-emitting lasers 2 which are arranged in a straight line, as shown in FIG. 12, and the lens member 8a disposed relative to each plane light-emitting lasers 2 constituting this plane light-emitting laser array 2a. It should be noted that a drive element (un-illustrated), such as TFT is provided relative to the plane light-emitting laser 2, and that a temperature compensation circuit (un-illustrated) is installed in this laser printer head.

Further, a laser printer according to an exemplary aspect of the present invention is constructed with the provision of the laser printer head of such construction.

As far as such laser printer head is concerned, since it is equipped with the optical device, as mentioned above, having proper light-emitting characteristics (optical characteristics), it becomes a laser printer head with excellent plotting characteristics.

Further, as far as a laser printer equipped with this laser printer head is concerned, since it is equipped with a laser printer head with excellent plotting characteristics as mentioned above, the laser printer itself excels in plotting characteristics.

The micro lens according to an exemplary aspect of the present invention is applicable for use in a variety of optical devices other than the above-mentioned usage. For example, it may be used as an optical device set up in a light-receiving surface of a solid imaging device (CCD), an optical coupling part of an optical fiber, a vertical cavity surface emitting laser (VCSEL), a photo disk (PD) and the like.

What is claimed is:

1. A micro lens comprising:
a substrate;
a base member formed on the substrate, the base member defines an upper surface, the upper surface of the base member having a concavity and a convexity with at least a part of the upper surface of the base member being subjected to repellant treatment; and
a lens member formed by a liquid droplet ejection method,
the lens member being formed on the upper surface of the base member to which a lens material is ejected in a plurality of dots by the liquid droplet ejection method.

2. The micro lens according to claim 1, further comprising:
a convexity on the upper surface of the base member.

3. The micro lens according to claim 2, further comprising:
a disengagement preventing device being provided on the convexity on the upper surface of the base member to prevent the lens member from disengaging from the convexity.

4. The micro lens according to claim 3:
the disengagement preventing device having a shape of the convexity which is formed of a portion of a minimum cross-sectional area of the convexity and a portion of the convexity of a larger cross-sectional area than the minimum cross-sectional area which is above the portion of the minimum cross-sectional area relative to the upper surface of the base member.

5. The micro lens according to claim 3:
the disengagement preventing device being a lyophilic portion formed on at least a part of the convexity of the base member.

6. The micro lens according to claim 1:
a shape of the upper surface of the base member being an elliptic, a circle or a polygon.

7. The micro lens according to claim 1:
the base member having transparency.

8. An optical device, comprising:
a plane light-emitting laser; and
the micro lens according to claim 1, the micro lens being disposed at a light-emitting side of the plane light-emitting laser.

9. An optical transmitter, comprising:
the optical device according to claim 8;
a light receiving element; and
a light transmission device to transmit light emitted from the optical device to the light receiving element.

10. A laser printer head, comprising:
the optical device according to claim 8.

11. A laser printer, comprising:
the laser printer head according to claim 10.

12. A fabrication method of a micro lens having a lens member formed by a liquid droplet ejection method, comprising:
forming on a substrate a base member having a shape of a concavity and a convexity on a surface thereof;
applying repellent treatment to at least a part of the upper surface of the base member; and
ejecting a lens material in a plurality of dots by the liquid droplet ejection method to the upper surface of the base member and forming a lens member on the upper surface of the base member.

* * * * *